(12) United States Patent
Pau

(10) Patent No.: US 11,371,888 B2
(45) Date of Patent: Jun. 28, 2022

(54) MICROBOLOMETER APPARATUS, METHODS, AND APPLICATIONS

(71) Applicant: Arizona Board of Regents on Behalf of the University of Arizona, Tucson, AZ (US)

(72) Inventor: Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/570,636

(22) Filed: Sep. 13, 2019

(65) Prior Publication Data

US 2020/0003626 A1   Jan. 2, 2020

Related U.S. Application Data

(63) Continuation of application No. 15/834,422, filed on Dec. 7, 2017, now Pat. No. 10,451,486.

(Continued)

(51) Int. Cl.
*H04N 5/33* (2006.01)
*G01J 5/0802* (2022.01)
*G02B 5/20* (2006.01)
*G01J 5/08* (2022.01)
*G01J 5/0821* (2022.01)
(Continued)

(52) U.S. Cl.
CPC .......... *G01J 5/0802* (2022.01); *G01J 5/0821* (2013.01); *G01J 5/0881* (2013.01); *G01J 5/10* (2013.01); *G01J 5/59* (2022.01); *G02B 5/201* (2013.01); *G02B 5/208* (2013.01); *G02B 27/286* (2013.01); *H04N 5/33* (2013.01); *H04N 9/07* (2013.01); *G01J 2005/0077* (2013.01); *G02B 6/08* (2013.01)

(58) Field of Classification Search
CPC ...... G01J 5/0862; G01J 5/0821; G01J 5/0825; G01J 5/0881
USPC .......................................................... 348/164
See application file for complete search history.

(56) References Cited

U.S. PATENT DOCUMENTS 7,750,301 B1   7/2010  Woolaway et al.
7,964,840 B2   6/2011  Parks
(Continued)

OTHER PUBLICATIONS

Tu, Xingzhou et al., "Optimized design of N optical filters for color and polarization imaging," Optics Express vol. 24, No. 3; Copyright 2016 OSA; pp. 3011-3024.
(Continued)

*Primary Examiner* — Nguyen T Truong
(74) *Attorney, Agent, or Firm* — George McGuire

(57) ABSTRACT

A polarization and color sensitive pixel device and a focal plane array made therefrom. Each incorporates a thick color/polarization filter stack and microlens array for visible (0.4-0.75 micron), near infrared (0.75-3 micron), mid infrared (3-8 micron) and long wave infrared (8-15 micron) imaging. A thick pixel filter has a thickness of between about one to 10× the operational wavelength, while a thick focal plane array filter is on the order of or larger than the size or up to 10× the pitch of the pixels in the focal plane array. The optical filters can be precisely fabricated on a wafer. A filter array can be mounted directly on top of an image sensor to create a polarization camera. Alternatively, the optical filters can be fabricated directly on the image sensor.

7 Claims, 8 Drawing Sheets

Related U.S. Application Data

(60) Provisional application No. 62/438,523, filed on Dec. 23, 2016.

(51) Int. Cl.
| | | |
|---|---|---|
| *G02B 27/28* | (2006.01) | |
| *G01J 5/10* | (2006.01) | |
| *H04N 9/07* | (2006.01) | |
| *G01J 5/59* | (2022.01) | |
| *G02B 6/08* | (2006.01) | |
| *G01J 5/00* | (2022.01) | |

(56) References Cited

U.S. PATENT DOCUMENTS

| | | | |
|---|---|---|---|
| 8,411,146 B2 | 4/2013 | Twede | |
| 8,866,997 B2 | 10/2014 | Pau et al. | |
| 8,885,987 B2 | 11/2014 | Augusto | |
| 2012/0307128 A1* | 12/2012 | Vorovitchik | G02B 5/201 348/336 |
| 2014/0078259 A1 | 3/2014 | Hiramoto et al. | |
| 2015/0109651 A1* | 4/2015 | Branda | B29D 11/00634 359/238 |
| 2015/0271425 A1* | 9/2015 | Fukuda | H01L 27/14621 348/320 |
| 2015/0281538 A1 | 10/2015 | Boettiger et al. | |
| 2015/0301249 A1 | 10/2015 | Pau et al. | |
| 2016/0037089 A1 | 2/2016 | Silny et al. | |
| 2016/0170110 A1 | 6/2016 | Pau et al. | |
| 2016/0233259 A1 | 8/2016 | Sekine | |
| 2016/0245698 A1 | 8/2016 | Pau et al. | |
| 2018/0180486 A1* | 6/2018 | Pau | G01J 3/0224 |

OTHER PUBLICATIONS

Chipman, Russell A., "Mueller Matrices," Polarimetry, (2009); pp. 14.1-14.44.

Hsu, Wei-Liang, et al., "Infrared liquid crystal polymer micropolarizer,"; Applied Optics, vol. 53, No. 23, Aug. 10, 2014; copyright 2014 Optical Society of America; pp. 5252-5258.

Zhang, Lipei, et al., "Polymeric infrared reflective thin films with ultra-broad bandwidth," Liquid Crystals 2016, vol. 43, No. 6, Copyright 2016 Taylor & Francis; pp. 750-757.

Liu, Yongmin, et al., "Metamaterials: a new frontier of science and technology," Chem. Soc. Rev. 2011; journal Copyright The Royal Society of Chemistry 2011, 40, pp. 2494-2507.

Kaschke, Johannes, et al. "Optical and Infrared Helical Metamaterials," Nanophotonics 2016: 5 (4):© 2016 Johannes Kaschke and Martin Wegener, published by De Gruyter Open; pp. 510-523.

Passilly, Nicolas, et al., "Achromatic phase retardation by subwavelength gratings in total internal reflection," Journal of Optics A: Pure and Applied Optics 10 (2008) 015001; Copyright 2008 IOP Publishing Ltd.; pp. 1-6.

Hsu, Wei-Liang, et al., "Polarization microscope using a near infrared full-Stokes imaging polarimeter", Optics Express Feb. 23, 2015; vol. 23, No. 4; © 2015 OSA; pp. 4357-4368.

Peng, Fenglin, et al.; "Recent advances in IR liquid crystal spatial light modulators," Proc. SPIE vol. 9565, Liquid Crystals XIX, 95650M; Copyright 2015 SPIE; 6 pages.

Kang, Guoguo, et al.; "Achromatic phase retarder applied to MWIR & LWIR dual-band," Optics Express Jan. 18, 2010, vol. 18, No. 2; Copyright 2010 OSA; pp. 1695-1703.

\* cited by examiner

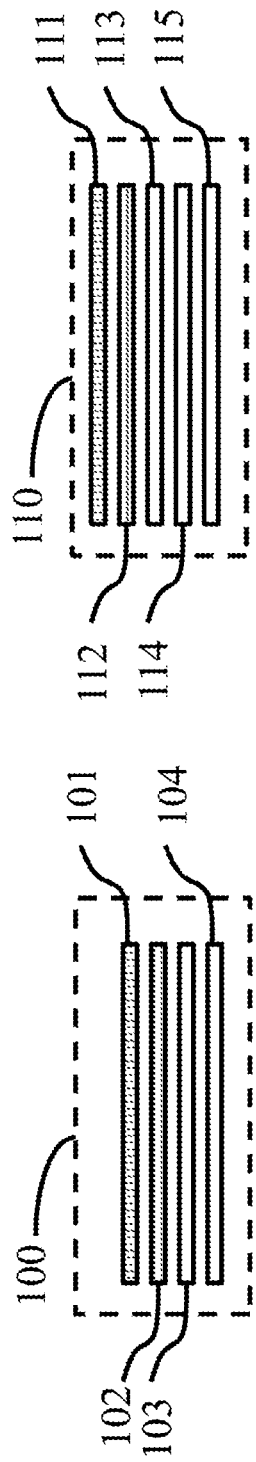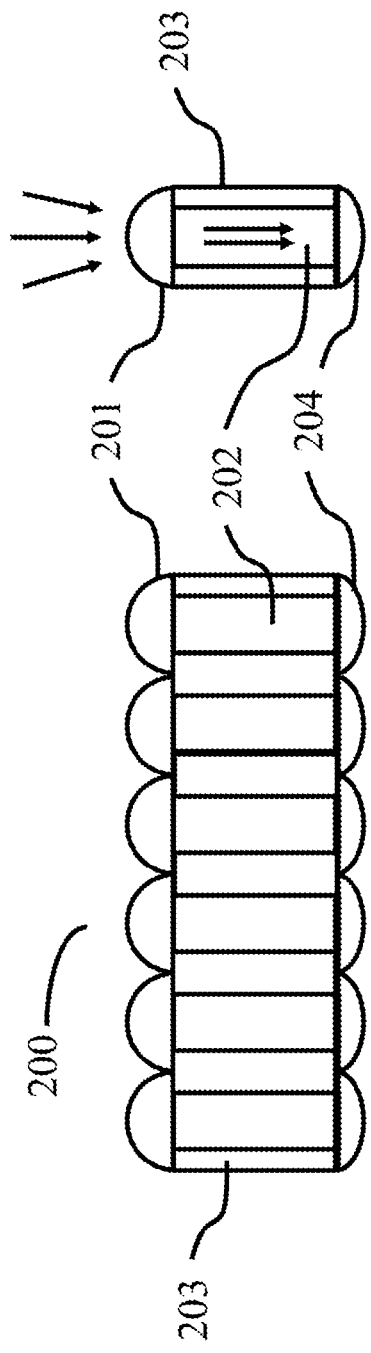

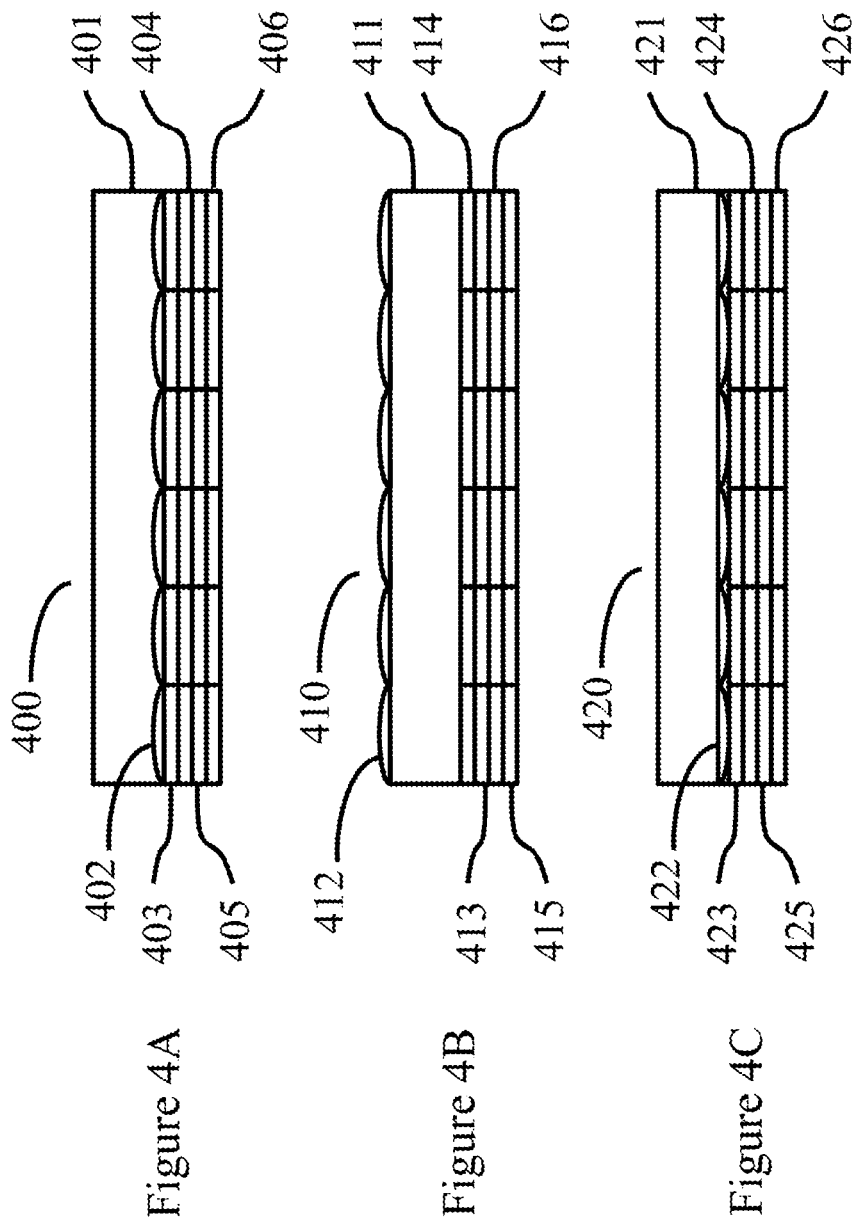

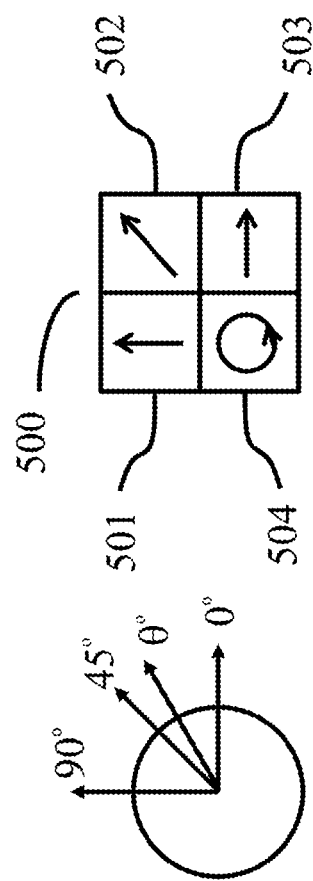
Figure 5A
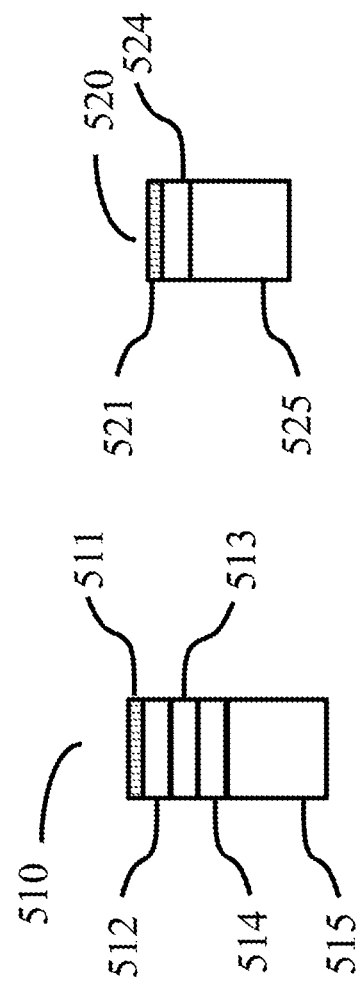
Figure 5B
Figure 5C

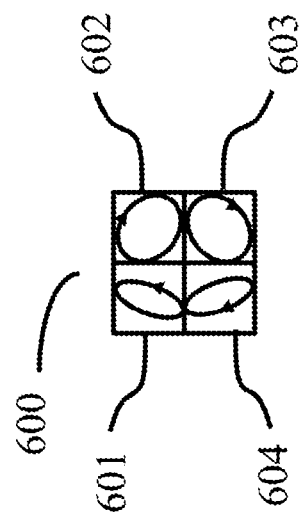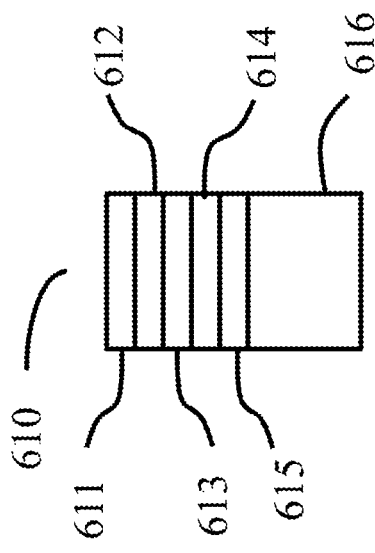

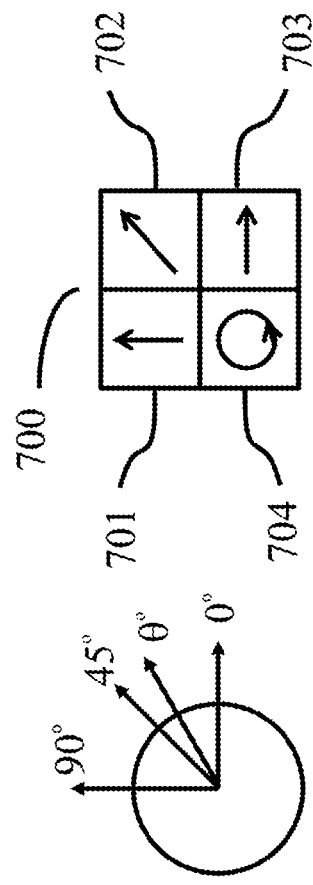
Figure 7A
Figure 7B
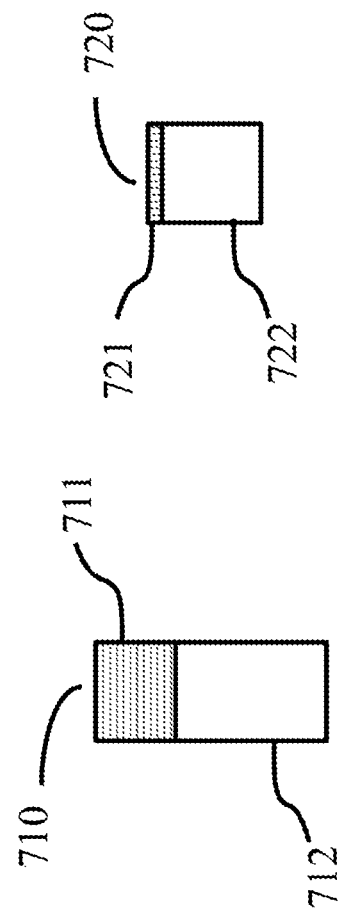
Figure 7C

MICROBOLOMETER APPARATUS, METHODS, AND APPLICATIONS

CROSS-REFERENCE TO RELATED APPLICATIONS

This application is a continuation of U.S. Non-Provisional application Ser. No. 15/834,422, filed on Dec. 7, 2017, which claims priority to U.S. Provisional Application Ser. No. 62/438,523 filed on Dec. 23, 2016, the entirety of each of which is incorporated herein by reference.

BACKGROUND OF THE INVENTION

Aspects and embodiments of the invention are in the field of optical sensors, optical sensing methods, and applications thereof. Aspects and embodiments more particularly pertain to an imaging apparatus, methods, and applications and most particularly to a wavelength (color)- and polarization-sensitive pixel device, a color- and polarization-sensitive focal plane array comprising a plurality of said pixel devices, a color- and polarization-sensitive microbolometer apparatus, and associated methods and applications.

Polarization is a property of light wherein rays of light have different amplitudes in different directions. The polarization state of light is invisible to the unaided human eye. People can differentiate colors coming from an object but cannot distinguish the different directions of polarization. Photographers often use a polarizer with a camera to reduce glare and to improve contrast, but these are add-on components and typically are not part of the detector systems. Conventional cameras, including digital cameras, are polarization blind without these add-on components.

A conventional digital color camera uses small color filters such as red, green, and blue filters to measure color information at different pixels. In order to image the polarization state of light, a polarization camera may use a small polarizer filter with dimensions equal to the size of the pixel.

An imaging polarimeter can be used to sample the polarization signature across a scene with the recorded images quantified as Stokes vectors S, which consist of the four elements S0, S1, S2, and S3. S0 represents the intensity of an optical field; S1 and S2 denote the affinity towards 0° and 45° linear polarization respectively; and S3 expresses the difference between right and left circular polarizations. Using S, the angle of linear polarization, the degree of polarization (DOP), the degree of linear polarization (DOLP), and the degree of circular polarization (DOCP) across a scene can be derived and investigated.

$$\theta_{linear} = \frac{1}{2}\tan^{-1}\frac{S_2}{S_1} \quad (1)$$

$$DOP = \sqrt{S_1^2 + S_2^2 + S_3^2}/S_0 \quad (2)$$

$$DOLP = \sqrt{S_1^2 + S_2^2}/S_0 \quad (3)$$

$$DOCP = S_3/S_0 \quad (4)$$

Measurement of polarization provides valuable information. Such information has been used, e.g., to construct the 3D shape of an unknown object, to image a target through dust, clouds, haze, and water, and to identify malignant cancer cells from healthy tissue. Polarization cameras enable measurement of polarization states and novel imaging applications in optical sciences and engineering. Polarization imaging has important applications in material sciences, medicine and remote sensing. Using infrared wavelengths, specific applications include surveillance and night vision, with a camera capable of being attached to, e.g., a fixed object, an autonomous vehicle, or a drone.

The properties of optical filters can be described by the Mueller matrix, which is a 4×4 matrix with coefficients that are generally wavelength and angle dependent. Incoming light described by the Stokes vector S' is transmitted through an optical filter described by a Mueller matrix M and is converted to outgoing light described by a Stokes vector S as follows:

$$\begin{bmatrix} m_{0,0} & m_{0,1} & m_{0,2} & m_{0,3} \\ m_{1,0} & m_{1,1} & m_{1,2} & m_{1,3} \\ m_{2,0} & m_{2,1} & m_{2,2} & m_{2,3} \\ m_{3,0} & m_{3,1} & m_{3,2} & m_{3,3} \end{bmatrix} \begin{pmatrix} S_0' \\ S_1' \\ S_2' \\ S_3' \end{pmatrix} = \begin{pmatrix} S_0 \\ S_1 \\ S_2 \\ S_3 \end{pmatrix} \quad (5)$$

Important parameters of the optical filters are diattenuation, D, which describes the difference in maximum and minimum transmittances of orthogonal polarization states, polarizance, P, which describes the degree of polarization of the exiting light, and depolarization index, DI, which describes the deviation from an ideal depolarizer.

$$D = \frac{T_{max} - T_{min}}{T_{max} + T_{min}} = \frac{\sqrt{m_{0,1}^2 + m_{0,2}^2 + m_{0,3}^2}}{m_{0,0}} \quad (6)$$

$$P = \frac{\sqrt{m_{1,0}^2 + m_{2,0}^2 + m_{3,0}^2}}{m_{0,0}} \quad (7)$$

$$DI = \frac{\sqrt{\sum_{i,j=0}^{3} m_{i,j}^2 - m_{0,0}^2}}{\sqrt{3}\, m_{0,0}} \quad (8)$$

An ideal polarizer preserves one eigenpolarization and completely eliminates the other eigenpolarization over two or more bands of wavelengths. For example, an achromatic polarizer covers both the near infrared (0.75 to 1.4 micron) and short wavelength infrared (1.4 to 3 micron). The ideal magnitudes of diattenuation and polarizance are one (1), and the depolarization index is zero (0). The transmittance or reflectance of the desired eigenpolarization is 100%, and those of the other eigenpolarization are 0%. In addition, for polarization imaging, the response in transmission and diattenuation should be constant at wide angle ranges because the incoming rays of light through an imaging lens can have a wide range of angles depending on the numerical aperture (N.A.) or f-number (f/#) of the lens.

In order to achieve the ideal response for the optical filter, i.e., broadband, wide angle, high extinction ratio, low loss etc., the optical filter is often made of multiple layers of materials. For color optical filters the materials can be multi-layer dielectric interference filters, dichroic materials, meta-materials, and/or color photo resists based on dye and/or pigment. For retarders and polarizers the materials can be liquid crystal polymers, birefringent materials, meta-materials, and/or a wire-grid in circular, linear, or elliptical configurations. For a birefringent material with index difference Δn between two eigen-axes, the phase shift Δφ between two eigenpolarizations increases with the thickness, d, of the material relative to the wavelength $\lambda$.

As the operating wavelength increases, the thickness of the filter must also increase in order to achieve the same phase shift. For normal dispersion of materials, both n and $\Delta$n generally decrease with increasing $\lambda$. For mid infrared wavelengths (3-8 micron), a single layer of birefringent material can be several microns thick. A broadband and wide angle design often requires multiple layers of materials. This is also true for interference filters, where increasing the thickness of the filter can improve the contrast of the filter. An ultra-broadband infrared optical filter operating from 0.5 to 11.5 microns can have a thickness of as much as 70 microns. For comparison, the size of a sensor pixel is of the order of 1 to 20 microns. For conventional imaging using a Bayer filter, the ratio of optical filter thickness to pixel size is less than one (<1), and a large percentage, approximately 70% to 90%, of the incident light at different angles is collected by the sensor after passing through the optical filter. For infrared wavelengths the same ratio can be greater than one (>1) and only a small percentage, approximately 20% to 50%, of the incident light is collected by the sensor because of the thickness of the IR filter. Light that is incident at large angles may be collected by adjacent pixels, leading to cross talk.

In view of the problems and challenges presented by the use of 'thick' optical filters as described hereinabove and appreciated by those skilled in the art, the inventor has recognized the advantages and benefits of providing an optical structure incorporating such thick filters that mitigates or eliminates the disadvantages of narrow acceptance angles, low light collection, low contrast, narrow bandwidth, crosstalk, high expense, and difficulty of fabrication, which said mitigation or elimination is realized by the embodied invention.

SUMMARY OF THE INVENTION

An aspect of the invention is a pixel device. An exemplary, non-limiting embodiment of a pixel device includes an optical component having an input and an output, adapted to focus and guide an incident light at the input; a thick optical filter component having a thickness between about $\lambda$ and 10$\lambda$, where $\lambda$ is an operation wavelength of the pixel device, disposed at the output of the optical component; an optical sensor component disposed at an output of the thick optical filter component; and an image processing component operatively coupled to the optical sensor component. In various non-limiting, exemplary embodiments, the pixel device may include some or all of the following features, components, steps, limitations, and/or characteristics, alone or in non-limiting combinations and/or variations appreciated by those skilled in the art:
  wherein the optical component comprises a microlens and a waveguide;
  further comprising a second optical component disposed intermediate the optical component output and the thick optical filter component;
  wherein the thick optical filter component comprises at least one of a wavelength (color) filter and a polarization filter;
  wherein the polarization filter includes at least one of a broadband linear polarizer, a broadband circular polarizer, and a broadband elliptical polarizer;
  wherein the operation wavelength of the pixel device, $\lambda$, is in a range of at least one of near infrared (0.75-3 micron), mid infrared (3-8 micron), and long wave infrared (8-15 micron).

An aspect of the invention is a focal plane array. An exemplary, non-limiting embodiment of a focal plane array includes a plurality of optical components having an input and an output, disposed in an array, adapted to focus and guide an incident light at the input; a corresponding plurality of thick optical filter components having a thickness between about $\lambda$ and 10$\lambda$, where $\lambda$ is an operation wavelength of the focal plane array, disposed in an array at the output of the optical component array; a corresponding plurality of optical sensor components disposed in an array at an output of the thick optical filter component array; and an image processing component operatively coupled to the optical sensor component array, wherein the focal plane array is both color and polarization sensitive. The operating wavelength has a range depending on the type of detector and applications. In this case, the operating wavelength can be the wavelength where the detector has a peak quantum efficiency. In various non-limiting, exemplary embodiments the focal plane array may include some or all of the following features, components, steps, limitations, and/or characteristics, alone or in non-limiting combinations and/or variations appreciated by those skilled in the art:
  wherein the thick optical filter component array comprises a plurality of at least two different color filters and at least two different polarization filters;
  further comprising a second optical component array disposed intermediate the optical component array output and the thick optical filter component array.

An aspect of the invention is a microbolometer. An exemplary, non-limiting embodiment of an integrated microbolometer includes a substrate; an infrared absorbing layer disposed on a surface of the substrate; a thick optical filter component disposed optically adjacent the infrared absorbing layer; and an optical component having an input and an output, adapted to focus and guide an incident light at the input to the thick optical filter. In various non-limiting, exemplary embodiments the microbolometer may include some or all of the following features, components, steps, limitations, and/or characteristics, alone or in non-limiting combinations and/or variations appreciated by those skilled in the art:
  wherein the optical component and the thick optical filter are integrated in the microbolometer via a direct fabrication process.

BRIEF DESCRIPTION OF THE DRAWINGS

FIG. 1A is a schematic cross sectional view of a pixel device according to an illustrative aspect of the invention.

FIG. 1B is a schematic cross sectional view of a pixel device according to another illustrative aspect of the invention.

FIG. 2A is a schematic cross sectional view of a focal plane array based on the pixel device illustrated in FIG. 1.

FIG. 2B is a schematic cross sectional view of part of FIG. 2A, showing the guiding of incident light rays.

FIG. 4A is a schematic cross sectional view of a microlens and thick optical filter array assembly.

FIG. 4B is a schematic cross sectional view of a microlens and thick optical filter array assembly.

FIG. 4C is a schematic cross sectional view of a microlens and thick optical filter array assembly, according to illustrative embodiments of the invention.

FIG. 5A is a schematic top view of a set of four adjacent thick optical filters including three linear polarizer filters and a circular polarizer filter.

FIG. 5B is a schematic cross-sectional view of the circular polarizer filter in FIG. 5A including a wire grid linear polarizer, a retarder layer, a second retarder layer, a color filter, and a transparent substrate.

FIG. 5C is a schematic cross-sectional view of one of three linear polarizer filters in FIG. 5A including a wire grid linear polarizer, a color filter, and a transparent substrate, according to illustrative embodiments of the invention.

FIG. 6A is a schematic top view of four adjacent thick optical filters with four respective, different elliptical polarizers.

FIG. 6B is a schematic cross-sectional view of one of the elliptical polarizer in FIG. 6A including three circular polarizer layers, an achromatic quarter wave plate layer, a retarder, and a transparent substrate, according to illustrative embodiments of the invention.

FIG. 7A is a schematic top view of a set of four adjacent thick optical filters including three different linear polarizers and a circular polarizer.

FIG. 7B is a schematic cross-sectional view of the circular polarizer in FIG. 7A.

FIG. 7C is a schematic cross-sectional view of one of the three linear polarizers in FIG. 7A including a wire grid linear polarizer on a transparent substrate, according to illustrative embodiments of the invention.

DETAILED DESCRIPTION OF THE INVENTION

Figure 3A:
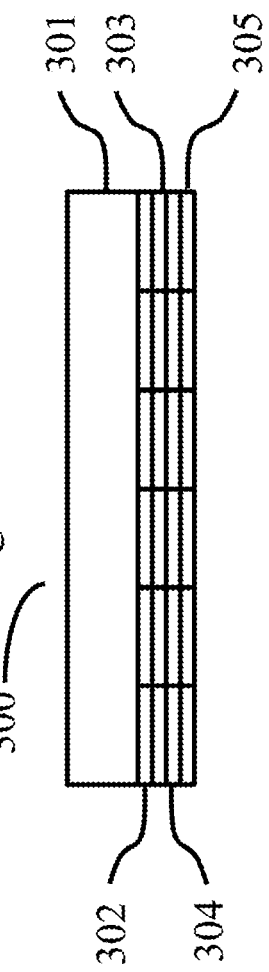
FIG. 3A is a schematic cross sectional view of a thick optical filter array.

A 'thick' optical filter is often necessary, particularly in the infrared (IR) regime to achieve an ideal response such as high transmission and contrast, wide angle and broadband. The thickness of the optical filter can be larger than the detector pixel size, leading to problems in collecting light at oblique angles. A solution embodied herein is to utilize additional micro-optics to collect and guide incoming light through the thick optical filter(s) to the optical sensor(s).

FIG. 1A is a schematic cross sectional view of a polarization- and color-sensitive pixel device 100. The pixel device 100 is made up of an optical component in the form of a microlens array that is optically coupled to (including but not limited to being physically connected to) a waveguide array, shown as assembly 101. The microlens/waveguide assembly 101 is further optically coupled to a thick optical filter 102 configured to and capable of providing wavelength (color) and polarization filtering for an operational wavelength/bandwidth of the device. The light is collected by a sensor component 103, which in turn is operationally coupled to storage and image processing circuits 104. In another embodiment shown in FIG. 1B, the pixel device 110 is made up of an optical component in the form of a microlens array that is optically coupled to (including but not limited to being physically connected to) a waveguide array, shown as assembly as 111. The microlens/waveguide assembly 111 is further optically coupled to a thick optical filter 112 configured to and capable of providing wavelength (color) and polarization filtering for an operational wavelength/bandwidth of the device. The output of the optical filter 112 is collected by a second layer of microlens array 113. The light is collected by a sensor component 114, which in turn is operationally coupled to storage and image processing circuits 115.

The microlens may be an achromat, may be a free-form lens, may be anti-reflection (AR)-coated, or have other suitable characteristics as a person skilled in the art would understand. As would be further clearly understood by a person skilled in the art, a pixel is a unit image sensor and, according to the embodied invention, a polarization- and color-sensitive focal plane array (FPA) 200 as shown in FIG. 2 is comprised of a coupled or integrated array of pixel devices as described herein. As illustrated in FIG. 2A, the optical array includes a microlens array 201 and a light guide component 202 with the light guiding regions surrounded by cladding regions 203, to minimize crosstalk between components. 204 represents another microlens array to collect the output of the waveguide 202. Although the sensor array and processing layer of the FPA 200 are not shown, FIG. 1B similarly represents the FPA 200 as the stated plurality of pixel devices 110.

In operation, incident broadband light (arrows in FIG. 2B) is collected by achromatic micro-optics array 201. The light propagates through the light guide 202. As shown in FIGS. 1B and 2B, another microlens 113 in the pixel device and another microlens array 204 in the FPA may be disposed at an output side of the waveguide to further focus the output light and to reduce crosstalk.

For the FPA, the size and pitch of the micro-optics advantageously match the size and pitch of the sensor pixels. The micro-lenses in the array, however, do not need to be identical to each other. For example, a micro-lens at an edge of the sensor array may have a different shape than the micro-lens at the center of the sensor array to, e.g., reduce lens shading on the periphery of the pixel array.

Figure 3B:
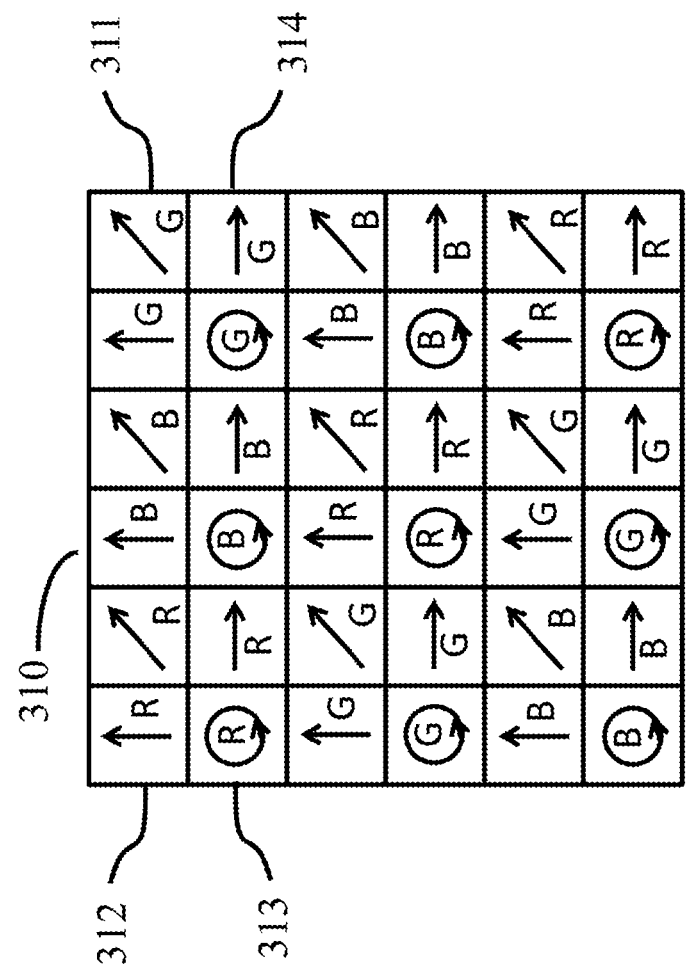
FIG. 3B is a schematic top plan view of the thick optical filter array in FIG. 3A including different color and polarization filters, according to illustrative embodiments of the invention.

After collection and focusing, the light passes through an array of thick optical filters illustrated in FIG. 3A, which shows a transparent substrate 301 and multiple layers of pixelated materials 302, 303, 304, 305. The optical filters can be color and polarization filters with multiple layers to achieve the desired optical transmission properties. The multiple layers can be dielectric coatings, polymers, metamaterials, and gratings of metal and/or dielectric. The multiple layers can be separated by a thin transparent barrier layer. The polarizers can be linear, circular, and elliptical. The color filters can cover the ultraviolet, visible, and near infrared to far infrared regions. The thick filters are pixelated as shown in FIG. 3B, in which 311 includes a linear polarizer at 45 degrees and a green color filter, G; 312 includes a linear polarizer at 0 degrees and a red color filter, R; 313 includes a circular polarizer and a red color filter, R; 314 includes a linear polarizer at 90 degrees and a green color filter, G. B denotes a blue color filter.

Depending on the application, adjacent filters can have different optical transmission values. One example has red, green, and blue color filters, linear polarizer at 0, 45, 90 degrees, and circular polarizers. Other examples may include UV, near IR, mid IR, long wave IR color filters, linear, elliptical, and circular polarizers. For some embodiments, it may be simpler and more economical to combine the array of micro-optics and optical filters onto a single substrate as illustrated in FIGS. 4A, 4B, 4C. In FIG. 4B an optical filter array 410 is made of a substrate 411, an array of microlenses 412, an array of optical filters with layers 413, 414, 415, 416. In FIG. 4C an optical filter array 420 is made of a substrate 421, an array of microlenses 422, an array of optical filters with layers 423, 424, 425, 426.

Multi-Layer Optical Filter Example 1

FIG. 5A shows an array 500 of four thick optical filters 501, 502, 503, 504, which can be repeated across a focal plane array. The size of the thick optical filters advantageously matches the size of the pixel. The illustrated filters are designed to operate in the short wave infrared (SWIR, 1.4-3 micron) region. Three of the filters (501, 502, 503) are linear polarizers and each linear polarizer is made of a broadband wire grid polarizer, 521, and a color filter, 524, that passes near infrared light as shown in FIG. 5C. A circular polarizer, 504, as shown in FIG. 5B is made of a broadband wire grid polarizer, 511, two retarder layers of different orientations, 512 and 513, and a color filter, 514. Although a single retarder layer with low dispersion can be used, two retarder layers are generally necessary to create a broadband retarder. Additional retarder layers, such as a third retarder layer, may improve the angular and wavelength performance of the retarder. This retarder layer can be, e.g., a c-plate liquid crystal polymer layer. The four optical filters form a super-pixel and can measure all four components of the Stokes vector, S, in the near infrared band. The set of filters can be aligned and mounted on top of a focal plane array with the wire grid polarizer facing the focal plane array. This configuration can be used as a broadband near infrared full Stokes imaging polarimeter.

Multi-Layer Optical Filter Example 2

FIG. 6A shows an array 600 of four thick optical filters 601, 602, 603, 604, which can be repeated across a focal plane array. The filters are designed to operate in the mid-wave infrared (MWIR, 3-8 micron) region. The four filters are different achromatic elliptical polarizers and the orientation and ellipticity of the polarizers are designed to optimally measure the full Stokes vector. The elliptical polarizers are made of a layer of circular polarizer, 611, a second layer of circular polarizer, 612, a third layer of circular polarizer, 613, an achromatic quarter wave plate, 614, and a retarder with retardance of 132°, 615 as shown in FIG. 6B. In an exemplary embodiment the retarder 615 has fast axis angles of ±15.1° (601,604) and ±51.7° (602,603). Multiple layers of circular polarizer are used to increase the bandwidth and contrast of the optical filter. The retarder layer can be made of chlorinated liquid crystal compounds and mixtures with low absorption loss in the SWIR and MWIR. The set of filters can be aligned and mounted on top of a focal plane array with the circular polarizer facing the focal plane array. This configuration can be used as a broadband MWIR full Stokes imaging polarimeter.

Multi-Layer Optical Filter Example 3

FIG. 7A shows an array 700 of four thick optical filters 701, 702, 703, 704, which can be repeated across a focal plane array. The size of the optical filters matches the size of the pixel. The filters are designed to operate in long wave infrared (LWIR, 8-15 micron) region. Three of the filters (701, 702, 703) are linear polarizers and each linear polarizer, 720, is made of a broadband wire grid polarizer, 721, on a transparent substrate 722 as shown in FIG. 7C. A circular polarizer, 704, is made of a broadband circular polarizer, 711, on a transparent substrate 712 as shown in FIG. 7B. Although a single broadband circular polarizer layer can be used, additional layers, such as a second circular polarizer layer, may improve the performance of the broadband polarizer. The broadband circular polarizer, 711, can be made of cholesteric liquid crystal polymer with a pitch gradient, multiple layers of cholesteric liquid crystal polymer of different pitches, or a stack of subwavelength structured gratings with wire grid polarizer. The four optical filters form a super-pixel and can measure all four components of the Stokes vector in the long wave infrared band. The set of filters can be aligned and mounted on top of a focal plane array with the circular polarizer facing the focal plane array. This configuration can be used as a broadband LWIR full Stokes imaging polarimeter.

Figure 9:
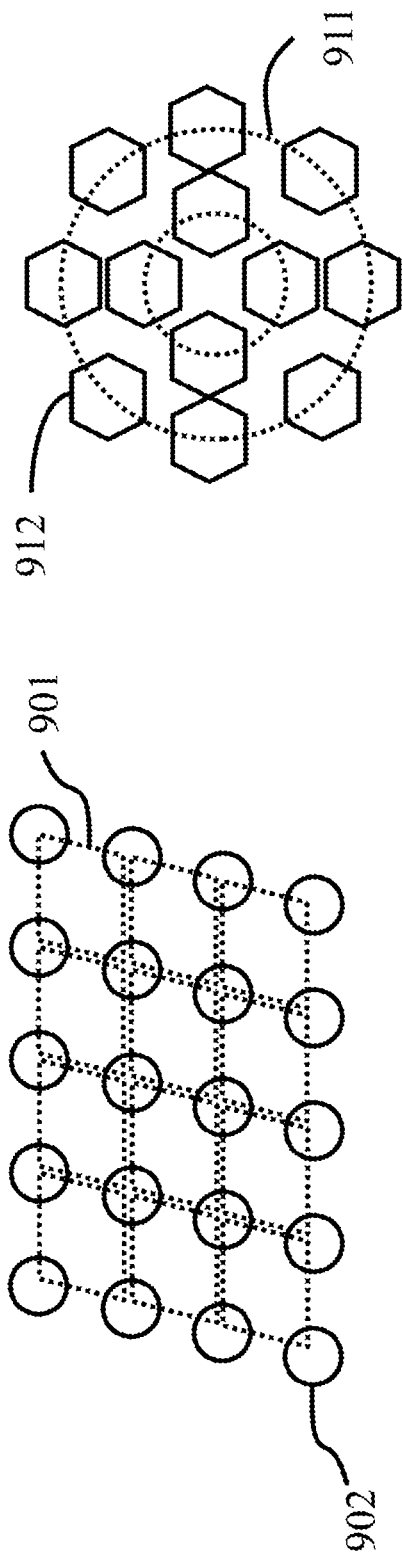
FIG. 9 shows an example of a non-square distribution of circular pixels and an example of a non-periodic distribution of hexagonal pixels in concentric circular configuration, according to illustrative aspects of the invention.

The detector array described is not limited to a repeating square grid. In some embodiments, the detector array can be a linear array, a non-square grid, such as hexagonal or parallelogram, or a non-periodic configuration. The pixel and filter shape is also not limited to a square, and can be any arbitrary shape, such as, e.g., rectangle, circle, ellipse, polygon, or any shape combination that particularly suits the object being imaged. An example of a non-square grid is shown in FIG. 9, where an array of circular pixels 902 is arranged in a lattice of a parallelogram 901. An example of a non-periodic configuration is also shown in FIG. 9, where an array of hexagonal pixels 912 is arranged along concentric circles 911. For some applications, the shape of the pixel can be designed to match the shape of the object to be detected, and the distribution of the pixels can be designed to match the distribution of objects or the intensity distribution of the objects to be detected. These designs can improve the signal-to-noise ratio of the measurements.

In the embodiments, the optical sensor array can be a CMOS image sensor (CIS). The CIS can be fabricated as a front-illuminated structure (FSI) or a back-illuminated structure (BSI) as known in the art. The CIS can be fabricated by using a process that is optimized for CMOS sensor. The image signal processor (ISP) can be fabricated by using a separate process that is optimized for low power and fast processing. The CIS and ISP can be stacked and packaged together to reduce the total area of the chip as is often done in a cell phone camera. The optical sensor array can also be a CCD image sensor or a single-photon avalanche diode (SPAD) for visible and near infrared imaging; InGaAs sensor for short wave infrared (SWIR) imaging; InSb sensor for mid wave infrared (MWIR) imaging; HgCdTe sensor, quantum-well infrared photodetectors (QWIPs) or microbolometer for long wave infrared (LWIR) imaging.

Figure 8:
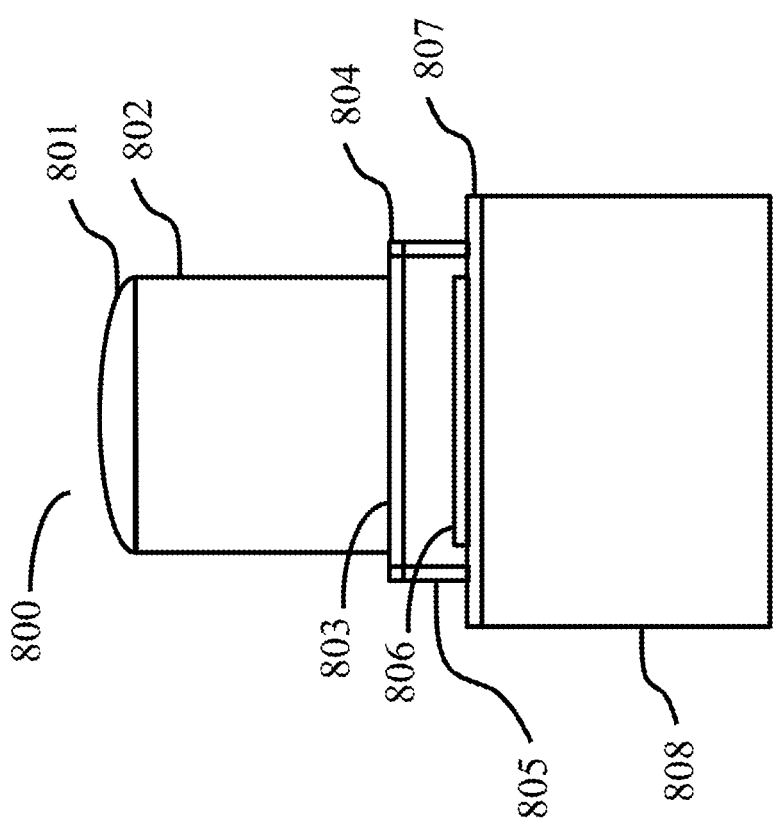
FIG. 8 is a schematic cross-sectional view of an integrated microbolometer showing micro-optics on top of an optical filter, fabricated on top of an infrared absorbing layer, a reflector layer and a contact layer, all on top of a substrate, according to an illustrative aspect of the invention.

There are recognized advantages to integrating the micro-optics and optical filters directly on the image sensor. The gap between the optical filters and image sensor advantageously is minimized to reduce crosstalk and optical loss, and this can be achieved by fabricating the filters and collection optics directly on the sensor. FIG. 8 shows a microbolometer 800. Light collection micro-optics 801 are disposed on top of a thick optical filter 802. Both 801 and 802 are fabricated on top of an infrared absorbing layer, 803. 804 and 805 are metallic contact and connections. 806 is a reflector layer and 807 is a contact layer. The entire device is disposed on top of a substrate 808.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of"

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An integrated microbolometer for mid to long wave infrared imaging, comprising:
   a substrate;
   an infrared absorbing layer disposed on a surface of the substrate;
   a thick optical filter component having a size and a thickness wherein the size matches the size of a pixel and the thickness is between 8 microns and 150 microns, disposed optically adjacent the infrared absorbing layer; and
   an optical component having an input and an output, adapted to focus and guide an incident light at the input to the thick optical filter component, wherein the optical component comprises a microlens and a waveguide.

2. The integrated microbolometer of claim 1, wherein the thick optical filter component includes a polarization filter.

3. The integrated microbolometer of claim 1, wherein the thick optical filter includes a wavelength filter.

4. The integrated microbolometer of claim 1, wherein the optical component and the thick optical filter component are integrated in the microbolometer via a direct fabrication process.

5. The integrated microbolometer of claim 1, wherein the thick optical filter includes a wavelength filter and a polarization filter.

6. An integrated microbolometer for mid to long wave infrared imaging, comprising:
- a substrate;
- an infrared absorbing layer disposed on a surface of the substrate;
- a thick optical filter component having a size and a thickness wherein the size matches the size of a pixel and the thickness is between 8 microns and 150 microns, disposed optically adjacent the infrared absorbing layer; and
- an optical component having an input and an output, adapted to focus an incident light at the input to the thick optical filter component, wherein the optical component comprises a microlens and a waveguide.

7. The integrated microbolometer of claim 6, wherein the thick optical filter component includes a wavelength filter and a polarization filter.

* * * * *